(12) United States Patent
Fuke et al.

(10) Patent No.: US 8,911,887 B2
(45) Date of Patent: Dec. 16, 2014

(54) COMPOSITE MATERIALS WITH METAL OXIDE ATTACHED TO LEAD CHALCOGENIDE NANOCRYSTAL QUANTUM DOTS WITH LINKERS

(75) Inventors: Nobuhiro Fuke, Los Alamos, NM (US); Alexey Y. Koposov, Los Alamos, NM (US); Milan Sykora, Los Alamos, NM (US); Laura Hoch, Toronto (CA)

(73) Assignee: Los Alamos National Security, LLC, Los Alamos, NM (US)

(*) Notice: Subject to any disclaimer, the term of this patent is extended or adjusted under 35 U.S.C. 154(b) by 0 days.

(21) Appl. No.: 13/274,071

(22) Filed: Oct. 14, 2011

(65) Prior Publication Data
US 2013/0284249 A1   Oct. 31, 2013

Related U.S. Application Data

(60) Provisional application No. 61/393,820, filed on Oct. 15, 2010.

(51) Int. Cl.
*H01G 9/20* (2006.01)
*B82Y 30/00* (2011.01)

(52) U.S. Cl.
CPC .............. *H01G 9/2027* (2013.01); *B82Y 30/00* (2013.01); *H01G 9/2054* (2013.01); *Y10S 977/948* (2013.01); *Y02E 10/542* (2013.01); *H01G 9/2031* (2013.01); *Y10S 977/774* (2013.01); *Y10S 977/827* (2013.01)
USPC ........... 428/701; 428/404; 428/704; 136/256; 977/774; 977/827; 977/948; 977/774

(58) Field of Classification Search
None
See application file for complete search history.

(56) References Cited

U.S. PATENT DOCUMENTS

| | | |
|---|---|---|
| 6,501,093 B1 | 12/2002 | Marks |
| 6,864,329 B2 | 3/2005 | Xiao et al. |
| 7,601,759 B2 | 10/2009 | MacKinnon et al. |
| 2008/0110494 A1 | 5/2008 | Reddy |
| 2009/0159120 A1* | 6/2009 | Wang et al. .................. 136/252 |
| 2009/0159131 A1* | 6/2009 | Zheng et al. .................. 136/263 |
| 2009/0283142 A1* | 11/2009 | Serban et al. ................ 136/256 |
| 2010/0019335 A1 | 1/2010 | Ivanov et al. |
| 2010/0254908 A1* | 10/2010 | Handa et al. ................. 424/9.3 |
| 2011/0281388 A1 | 11/2011 | Gough et al. |
| 2013/0020550 A1 | 1/2013 | Reddy |

OTHER PUBLICATIONS

Shen et al., "Assembly of CdS quantum dots onto mesoscopic TiO2 films for quantum dot sensitized solar cell applications," Nanotechnology, 19 (2008) 045602, 7 pages.*
Thiomalic acid, Hawley's Condensed Chemical Dictionary, 2002.*
Mercaptosuccinic acid, Hawley's Condensed Chemical Dictionary, 2002.*
Ruhle et al., "Quantum-Dot-Sensitized Solar Cells," *Chem. Phys. Chem*, 2010, 11:2290-2304.

* cited by examiner

*Primary Examiner* — David Sample
(74) *Attorney, Agent, or Firm* — Klarquist Sparkman, LLP (57) ABSTRACT

Composite materials useful for devices such as photoelectrochemical solar cells include a substrate, a metal oxide film on the substrate, nanocrystalline quantum dots (NQDs) of lead sulfide, lead selenide, and lead telluride, and linkers that attach the NQDs to the metal oxide film. Suitable linkers preserve the 1s absorption peak of the NQDs. A suitable linker has a general structure A-B-C where A is a chemical group adapted for binding to a $MO_x$ and C is a chemical group adapted for binding to a NQD and B is a divalent, rigid, or semi-rigid organic spacer moiety. Other linkers that preserve the 1s absorption peak may also be used.

20 Claims, 6 Drawing Sheets

Sub = Substrate
$MO_x$ = $TiO_2$, $SnO_2$, ZnO, $WO_3$, ...
NQD = PbS, PbSe, PbTe
A-B-C = linker

MSA = D,L-mercaptosuccinic acid
MPTMS = 3-mercaptopropyl)trimethoxysilane
APTMS = 3-aminopropyl)trimethoxysilane

*Fig. 4a*

BTCA: Benzene-1,3,5-tricarboxylic acid (BTCA)
TPA: Terephtalic acid (TPA)

*Fig. 4b*

D,L-mercaptosuccinic acid (MSA)

(3-mercaptopropyl)trimethoxysilane (MPTMS)

Benzene-1, 3, 5 -tricarboxylic acid (BTCA)

Terephtalic acid (TPA)

COMPOSITE MATERIALS WITH METAL OXIDE ATTACHED TO LEAD CHALCOGENIDE NANOCRYSTAL QUANTUM DOTS WITH LINKERS

RELATED APPLICATIONS

This application claims the benefit of U.S. Provisional Patent Application 61/393,820 filed Oct. 15, 2010, which is incorporated by reference herein.

STATEMENT REGARDING FEDERAL RIGHTS

This invention was made with government support under Contract No. DE-AC52-06NA25396 awarded by the U.S. Department of Energy and made under CRADA number LA08C10583 with the SHARP Corporation. The government has certain rights in the invention.

FIELD OF THE INVENTION

The invention relates to composite films including quantum dot sensitized films of metal oxide. More particularly, the invention relates to composite films of metal oxide and PbS, PbSe, and PbTe quantum dots, and to devices using with these composite films.

BACKGROUND OF THE INVENTION

Photoelectrochemical cells (PECs) based on a mesoporous, nanocrystalline metal oxide film sensitized with organic or organometallic dyes have been studied extensively for the past twenty years as a potential low cost alternative to more traditional, solid state photovoltaics. PECs include those typical device architectures known in the art such as those described in, for example, O'Reagan et al., Nature, Vol. 353, pp. 737-740, October 24, the content of which is incorporated by reference. An exemplary PEC may have an organic, organometallic or inorganic chromophore adsorbed on the surface of nanocrystalline metal oxide film, which forms a photoactive electrode. The second electrode consists typically of metal, such as platinum. The charge transport between the electrodes is facilitated by a liquid electrolyte comprising solvent and a charge transporting material.

Significant progress has been made in optimization of the components of the dye sensitized solar cell (DSSC) with highest reported efficiencies currently exceeding 11%. As part of search for new approaches to further improvement in efficiency over past several years, a number of research groups reported studies of PECs in which the sensitizing dyes are substituted with quantum confined semiconductor nanocrystals, also called nanocrystal quantum dots (NQDs) of materials, such as InP, CdS, CdSe, CdTe, PbS and InAs. In studies of these PECs, also called quantum dot sensitized solar cells (QDSSCs) it was demonstrated that NQDs can function as efficient sensitizers across a broad spectral range from the visible to mid-infrared, and offer advantages such as the tunability of optical properties and electronic structure by simple variation in NQD size, while retaining the appeal of low-cost fabrication. In addition, as was demonstrated recently, NQDs of certain materials (e.g., PbSe, PbS) have the ability to efficiently convert the energy of a single photon into multiple electron-hole pairs via a process called carrier multiplication (CM) or multiple exciton generation (MEG). Provided that carriers generated by the MEG effect can be effectively extracted from NQDs, this process has the potential to significantly improve the efficiency of QDSSCs.

Two distinct approaches to the sensitization of metal oxide ($MO_x$) films with NQDs have been demonstrated in recent studies. In one approach, NQDs are generated on the surface of $MO_x$ films in-situ, using chemical bath deposition (CBD) or successive ionic layer adsorption and reaction (SILAR). The advantage of the in-situ deposition approaches are their simplicity, the fact that the NQDs are in direct electronic contact with $MO_x$, and that they can easily produce $MO_x$ films with high surface coverage of the sensitizing NQDs. However, there are several limitations of the in-situ approaches, such as poor control over NQD chemical composition, crystallinity, size and surface properties, which are likely to limit effective exploitation of the advantages of the NQDs, such as MEG effect.

An alternative approach to development of these materials that include $MO_x$ films and NQDs is based on a two step process, whereby NQDs are first independently synthesized using established colloidal synthesis methods and the $MO_x$ film is subsequently sensitized by exposure to a concentrated solution of the NQDs. The advantage of this approach is a significantly higher control over the chemical, structural and electronic properties of the NQDs compared to the in-situ approaches.

SUMMARY OF THE INVENTION

The invention provides an article comprising a substrate, a metal oxide film on the substrate, quantum dots selected from PbS, PbSe, and PbTe, and a linker that chemically attaches the quantum dots to the metal oxide film. An embodiment linker has the structure A-B-C wherein A is a chemical group suitable for chemical bonding to the metal oxide film, wherein C is a chemical group suitable for chemically bonding to quantum dot, and wherein B is a rigid or semi-rigid spacer group covalently bonded to A and to C. Another embodiment linker has the structure D-E-G wherein D includes silicon, G is —SH, and E is divalent chemical moiety spacer group covalently bonded to D and to G. Another embodiment linker is HOOC—$CR_2$—CH(COOH)(SH) or a carboxylate salt thereof, wherein R is selected from H, alkyl, branched alkyl, cycloalkyl, —F, —Cl, —Br, —I, aryl, substituted aryl, alkenyl, substituted alkynyl, —CN, —OH, —COOH, and COO—.

The invention also provides an article including a substrate, a metal oxide film on the substrate, quantum dots selected from PbS, PbSe, and PbTe quantum dots, said quantum dots having a 1s absorbance peak in an absorbance spectrum of the quantum dots, and a linker that chemically attaches the quantum dots to the metal oxide film, the linker having the property of preserving the 1s absorbance peak in the absorbance spectrum for the quantum dots attached to the linker.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 4a also includes spectra of $PbS/TiO_2$, PbS NQDs in toluene solution, and $TiO_2$ film.

DETAILED DESCRIPTION

The present invention is concerned with articles that include composites of metal oxide (MOx), nanocrystalline quantum dots (NQDs), and linkers that chemically attach the NQDs to the metal oxide. These articles can be used with devices including, but not limited to, electrodes and solar cells such as photoelectrochemical cells (e.g. Quantum Dot Sensitized Solar Cells (QDSSCs)).

A "nanocrystalline quantum dot" (NQD) includes nanocrystalline particles of all shapes and sizes. Preferably, they have at least one dimension less than about 100 nanometers, but they are not so limited. There may be rods and may be of any length. "Nanocrystal", "nanorod" and "nanoparticle" can and are used interchangeably herein. In some embodiments of the invention, the nanocrystal particles may have two or more dimensions that are less than about 100 nanometers.

Suitable metal oxides are nanocrystalline and include, but are not limited to, transition metal oxides such as titanium oxide ($TiO_2$), tin oxide ($SnO_2$), zinc oxide (ZnO), tungsten oxide ($WO_3$), niobium oxide ($Nb_2O_5$), tantalum oxide ($Ta_2O_3$). Mixed metal oxides that include transition metals may also be used. These include, but are not limited to, barium titanate ($BaTiO_3$), strontium titanate ($SrTiO_3$), zinc titanate ($ZnTiO_3$), and copper titanate ($CuTiO_3$). These nanocrystalline metal oxides can include dopants such as, but not limited to, nitrogen, carbon, fluorine, and the like.

The NQDs of the present invention are generally referred to as colloidal NQDs. These NQDs are from among the group of PbS, PbSe, PbTe, and combinations thereof.

The NQDs were synthesized by a modified version of previously published procedures: M. A. Hines, and G. D. Scholes, "Colloidal PbS Nanocrystals with Size-Tunable Near Infrared Emission: Observation of Post-Synthesis Self-Narrowing of the Particle Size Distribution," Adv. Mat., volume 15, pp. 1844-1849 (2003), Sykora et. al., "Effect of air exposure on surface properties, electronic structure, and carrier relaxation in PbSe nanocrystals," ACS Nano, vol. 4, pp. 2021-2034 (2010), and Urban, J. J., et. al., "Self-Assembly of PbTe Quantum Dots into Nanocrystal Superlattices and Glassy Films," J. Am. Chem. Soc., vol. 126, pp. 3248-3266 (2006), all incorporated by reference herein. The synthesis and purification of all materials was performed under argon atmosphere.

Nanocrystalline $MO_x$ films were prepared using the procedure of Wang et al., "Enhance the Performance of Dye-Sensitized Solar Cells by Co-Grafting Amphiphilic Sensitizer and Hexadecylmalonic Acid on $TiO_2$ Nanocrystals", J. Phys. Chem. B, 107, 14336 (2003), such procedure is incorporated herein by reference. The films were deposited onto a substrate of 1 mm Fluorine doped tin oxide-coated glass (F—$SnO_2$ glass). Following the deposition the films were sintered at 500° C. to remove organic components. The thickness of the films was determined by step-profilometry using ALPHA STEP 500 TENCOR INSTRUMENTS profilometer.

Figure 1:
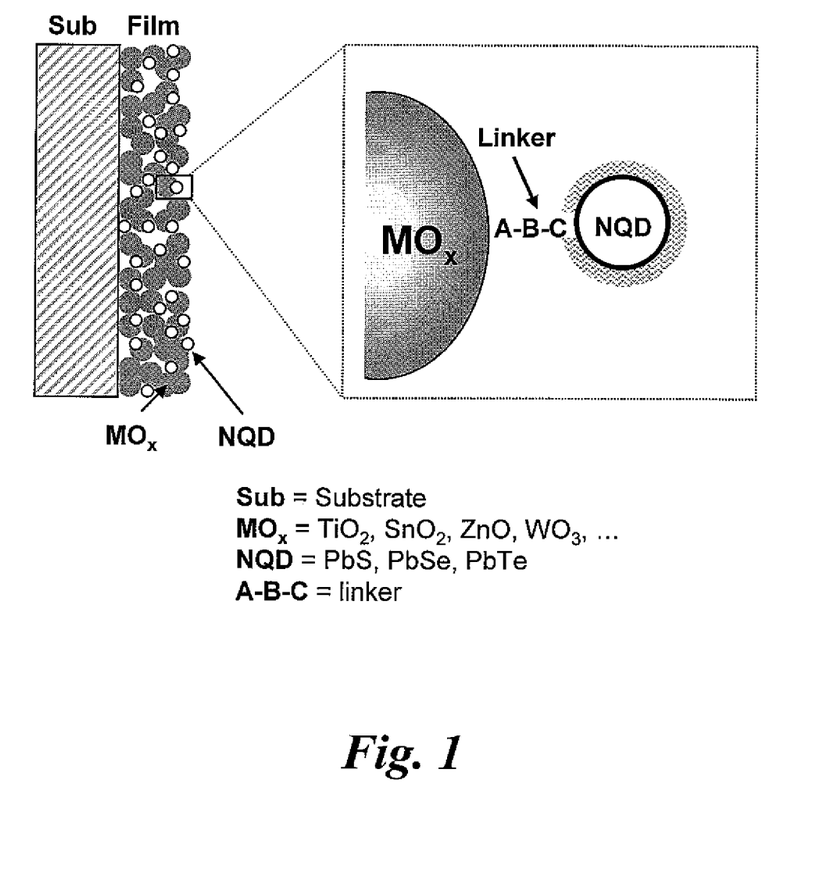
FIG. 1 shows a schematic diagram of an embodiment including a substrate, a metal oxide film on the substrate, and nanocrystalline quantum dots (NQDs) attached to the metal oxide film through a linker having a structure A-B-C wherein A is a chemical group that bonds the linker to the metal oxide, C is a chemical group that bonds the linker to the quantum dots, and B is a rigid or semi-rigid spacer group in between group A and group C.
Figure 2:
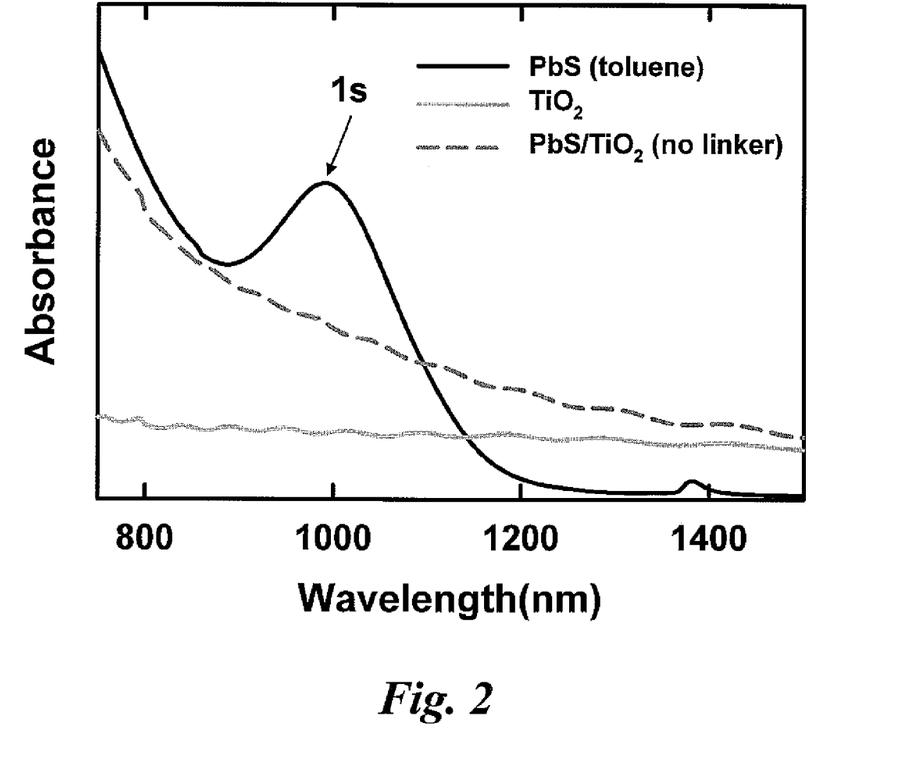
FIG. 2 shows an absorption spectrum of a layer of PbS NQDs directly adsorbed (i.e. without a linker) on a $TiO_2$ film, an adsorption spectrum of the NQDs in solution, and an absorption spectrum of the $TiO_2$ film prior to depositing the NQDs on the film.
Figure 3A:
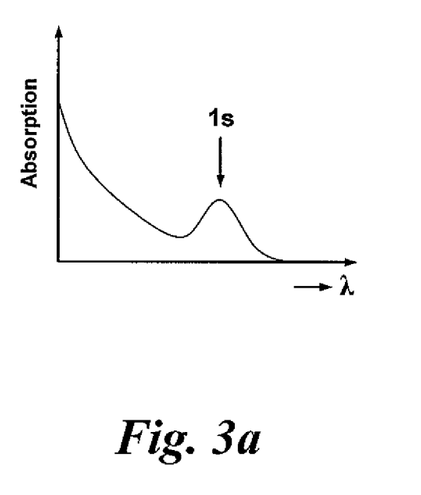
FIG. 3a shows an representation of an absorption spectrum of NQDs that includes the 1s absorption peak.
Figure 3B:
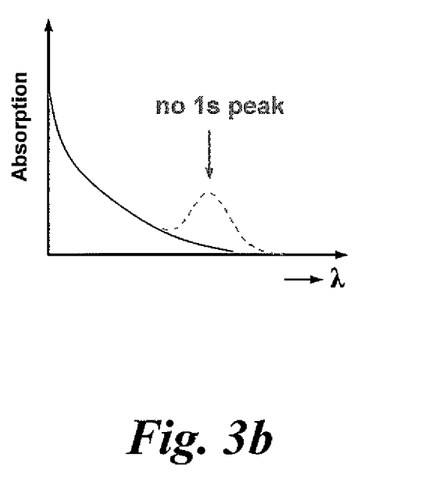
FIG. 3b shows a representation of an absorption spectrum of NQDs directly absorbed onto (i.e. without a linker) the surface of $MO_x$ film.

The $NQD/MO_x$ films were prepared by exposing freshly sintered $MO_x$ film to a toluene solution of NQDs. The NQDs adsorb effectively onto the $MO_x$ film as is apparent from changes in the absorption spectra of the films. According to FIG. 2, the absorption spectra of NQDs in solution are different from the absorption spectra of NQDs adsorbed onto a $MO_x$ film. In particular, the low energy absorption peak referred to herein as the 1s absorption peak is visible in the solution spectra of the NQDs, but is absent from spectra of the $NQD/MO_x$ films. It will be understood by a person skilled in the art of absorption that the 1s absorption peak of a NQD is the lowest energy absorbance peak in the absorbance spectrum for the quantum dot. FIG. 2 shows a portion of absorbance spectra including a spectrum of NQDs with the 1s absorbance peak at approximately 1000 nanometers (nm). This is the lowest energy peak in the absorbance spectrum for the NQDs of PbS in toluene. The tiny peak at about 1390 nanometers is not due to absorbance of energy by the NQDs and is likely due to the solvent toluene or to impurities in the solvent.

Embodiment films of this invention are films that preserve the 1s absorption peak of an absorption spectrum of the NQDs. The preservation of this 1s absorption peak is believed to be related to selection of appropriate linkers that bind the NQDs to the metal oxide. Thus, the $MO_x$ film was modified with an organic linker prior to adsorption of the NQDs. The linker is typically an organic molecule, or a salt of an organic molecule, and includes chemical groups that bind to the MOx film and to the NQDs.

In an embodiment, a suitable linker has the general structure A-B-C, wherein A is a chemical group adapted for binding to a $MO_x$, C is a chemical group adapted for binding to a NQD, and B is a divalent organic moiety covalently bonded to both chemical group A and chemical group C. In particular, divalent organic moiety B is rigid or semi-rigid. Examples of rigid divalent organic moiety B include, but are not limited to, divalent aryl in particular, 1,4-$C_6H_4$, 1,3-$C_6H_4$, —$CH_2$—$C_6H_4$—, divalent napthalenyl, trans 1,2-ethylenyl, 1,2-acetylenyl), and adamantyl. These divalent B groups have a rigid carbon structure, and the chemical groups A and C are positioned to maximize the distance between them. Some, such as the aryl and napthalenyl moieties have a planar structure. Examples of semi-rigid divalent organic moieties include cyclopentadienyl and heteroatom substituted cyclopentadienyl moieties such as divalent furanyl and substituted furanyl ($C_4R_2O$), wherein R is hydrogen, alkyl, and aryl. These are semi-rigid because the ring structure is not as rigid as a rigid aryl ring structure. Other semi-rigid ring structures include, but are not limited to, those that are also five membered rings but include a heteroatom such as oxygen (i.e. furanyl), nitrogen, phosphorus, sulfur. Thus, the rigid or semi-rigid spacer group B comprises 1,4-aryl, 1,3-aryl, benzyl, acetylenyl, 1,4-furanyl, 1,3-furnayl, 1,4-thiophenyl, 1,3-thiophenyl, 1,4-pyrrolyl, 1,3-pyrrolyl, 1,3-pyridenyl, 1,4-pyridenyl, 1,3-cyclopentadienyl, 1,4-cyclopentadienyl, adamantyl, napthalenyl, norbornanyl, norbornenyl. The rigid or semi-rigid spacer group also includes substituted derivatives of the aforementioned groups. In all of these cases, the B moiety separates the A group and the C group and prevents, or at least minimizes a situation where both the A group and the C group form bonds to the metal oxide. The rigidity of the B group prevents, or at least minimizes, conformations of the linker that allow both the A group and the C group from the same linker to form bonds with the metal oxide, which would reduce the number of quantum dots attached to the article.

Examples of suitable chemical coupling groups A are: carboxylic acid (—COOH), carboxylate (—COO—), phosphonic acid (—$PO_3H_2$), phosphonate (—$PO_3H^-$), boronic acid (—$B(OH)_2$), and boronate (—$BO_2H^-$), sulfonic acid (—$SO_3H$), and sulfonate (—$SO_3^-$).

Examples of suitable chemical groups C linker A-B-C are —COOH, —COO$^-$, —$PO_3H_2$, —$PO_3H^-$, —$B(OH)_2$, —$BO_2H^-$, —$SO_3H$, and —$SO_3^-$, and —SH.

In fabrication of embodiment NQD/Linker/$MO_x$ films, freshly sintered $MO_x$ film was first exposed to a solution of a linker in organic solvent (e.g., acetonitrile, tetrahydrofuran, ethanol) for 24 hours and subsequently rinsed with a pure solvent and allowed to dry. For the purposes of reproducibility, these procedures should be performed in air free environment, such as in an argon filled glove box. The dry films were exposed to a concentrated toluene solution of NQDs. This yielded composite films with general structure NQD/C-B-A/$MO_x$. The adsorption of NQDs onto the C-B-A/$MO_x$ is apparent from change in the color of the films and the change in their absorption spectra. The films were stored under argon atmosphere, in dark, at temperature <−20° C., until used for fabrication of a device, such as a QDSSC.

In another embodiment, a suitable linker has the general chemical structure D-E-G. In this linker, D is a chemical group that includes a silicon (Si) that is bonded to the metal oxide ($MO_x$). The G group is thiol group (—SH) bonded to the NQD. The E group is a divalent spacer group that is covalently bonded to the D group and to the G group.

Examples of suitable divalent organic linking groups E are aliphatic, aromatic, cycloaliphatic, and aromatic-cycloaliphatic, and also heteroatoms-containing aliphatic, aromatic, cycloaliphatic, and aromatic-cycloaliphatic, hydrocarbon radicals, such as (1) substituted or unsubstituted, preferably unsubstituted, linear or branched, preferably linear, alkanediyl radicals having from 1 to 10, preferably from 1 to 3, and in particular 3 carbon atoms, which may also contain cyclic groups within the carbon chain. (2) substituted or unsubstituted, preferably unsubstituted, linear or branched, preferably linear, alkenediyl radicals having from 1 to 10, preferably from 1 to 3, and in particular 3 carbon atoms, which may also contain cyclic groups within the carbon chain. (3) alkynediyl radicals having from 1 to 10, preferably from 1 to 3, and in particular 3 carbon atoms, which may also contain cyclic groups within the carbon chain (4) substituted or unsubstituted, preferably unsubstituted, linear or branched, preferably linear, oxaalkanediyl radicals having from 2 to 10, preferably from 2 to 3, and in particular 2 carbon atoms, which within the carbon chain may also contain cyclic groups, (5) divalent polyester radicals containing repeating polyester units of the formula —(—CO—$(CHR)_n$—$CH_2$—O—)—. In this formula the index n is preferably from 1 to 2 and the substituent R=hydrogen, or an alkyl, cycloalkyl or alkoxy radical. No substituent contains more than 3 carbon atoms; (6) phen-1,4-, -1,3- or -1,2-ylene, naphth-1,4-, -1,3-, -1,2-, -1,5- or -2,5-ylene, propane-2,2-di(phen-4'-yl), methane-di(phen-4'-yl), biphenyl-4,4'-diyl or 2,4- or 2,6-tolylene; or (7) cycloalkanediyl radicals having from 6 to 20 carbon atoms, such as cyclobutane-1,3-diyl, cyclopentane-1,3-diyl, cyclohexane-1,3- or -1,4-diyl, cycloheptane-1,4-diyl, norbornane-1,4-diyl, adamantane-1,5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4''-diyl, especially 3,3,5-trimethylcyclohexane-1,5-diyl or dicyclohexylmethane-4,4'-diyl. Aliphatic divalent organic linking groups can be preferred.

Of the suitable E groups listed above for the D-E-G linker, not all are suitable B groups for the A-B-C linker. Those that are rigid or semi-rigid, such as but not limited to, the aryl and alkynediyl radical groups, and other rigid moieties are suitable for the B groups. However, non-rigid groups such as aliphatic groups are not suitable B groups because they are not rigid or semi-rigid groups.

Linkers suitable with this invention are selected for their ability to preserve the 1s absorption peak in the absorption spectrum after the NQDs become attached to the linker.

Figure 4A:
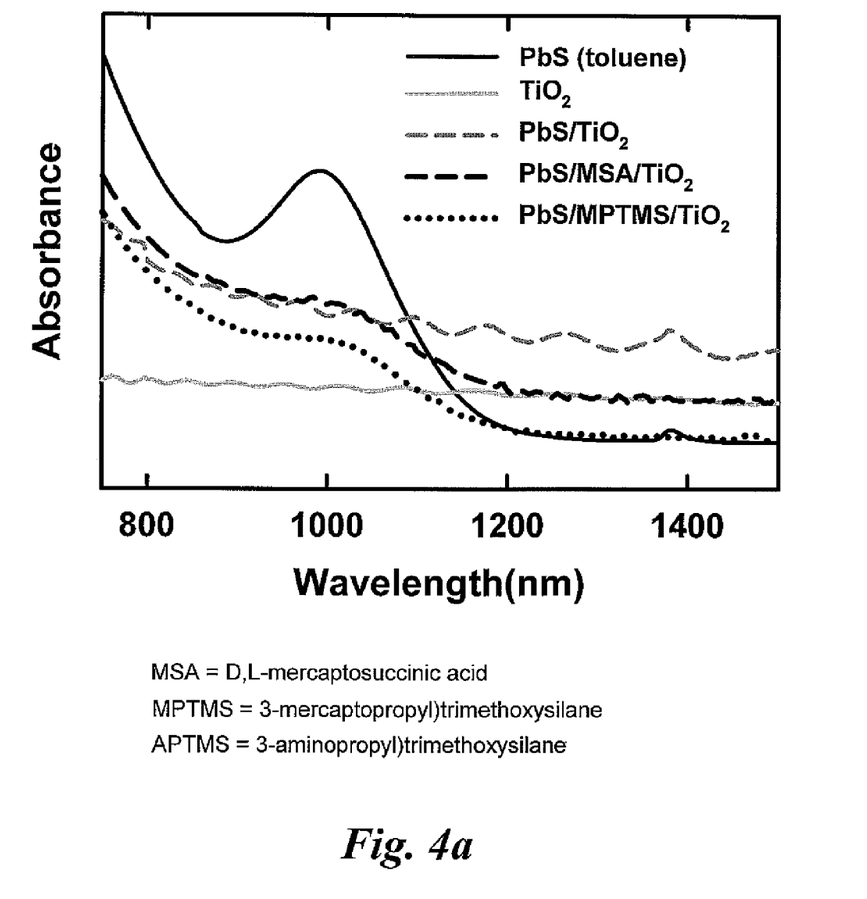
FIG. 4a shows absorption spectra, including films prepared with PbS NQDs, $TiO_2$, and two different embodiment linkers: D,L-mercaptosuccinic acid (MSA) and (3-mercaptopropyl) trimethoxysilane (MPTMS).
Figure 4B:
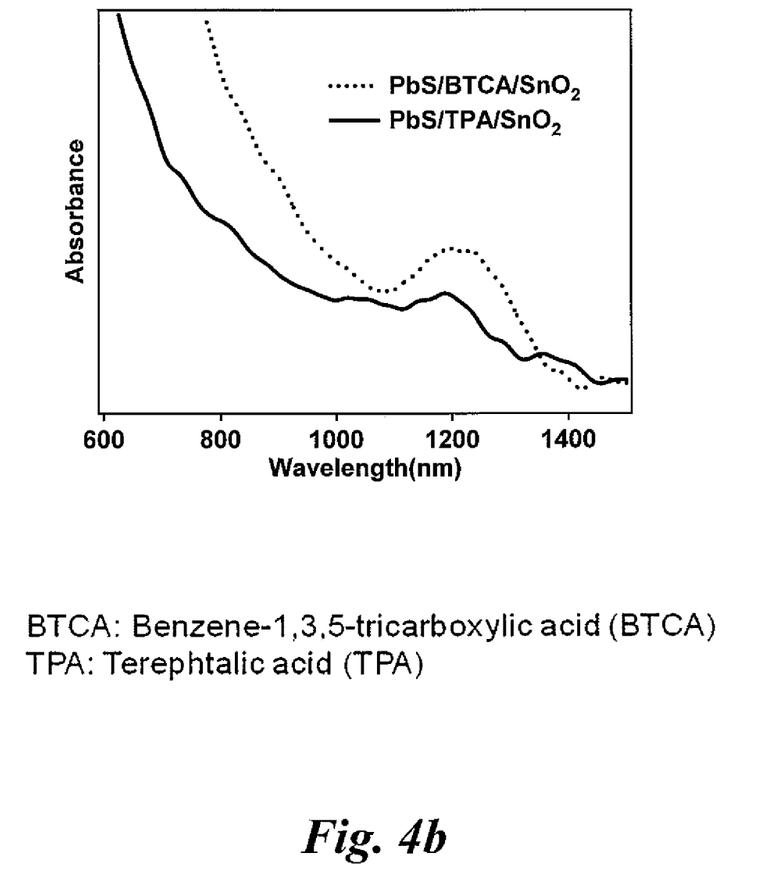
FIG. 4b shows absorption spectra for films prepared with PbS NQDs, TiO2, and BTCA (benzene-1,3,5-tricarboxylic acid), and TPA (terephthalic acid).

FIG. 4(a) shows several spectra for both embodiment and non-embodiment articles of this invention. These articles all have a metal oxide substrate (in this case, a titanium oxide film), NQDs (in these embodiments, NQDs of lead sulfide), and a variety of linkers. FIG. 4(a) includes an absorption spectrum of the embodiment PbS/MPTMS/$TiO_2$ article in which the is absorption peak for the NQDs (i.e. the PbS) is preserved. MPTMS is the acronym for the linker 3-mercaptopropyltrimethoxysilane. Similarly, the absorption spectrum for the embodiment article PbS/MSA/$TiO_2$, (where MSA=D, L-mercaptosuccinic acid) shown in FIG. 4(a) includes the 1s absorption peak. Thus, the MSA linker has preserved the 1s absorption peak of the PbS NQDs. FIG. 4b shows absorption spectra for embodiment films prepared with PbS NQDs, $TiO_2$, and BTCA (benzene-1,3,5-tricarboxylic acid), and TPA (terephthalic acid). The absorption spectra for these PbS/BTCA/$TiO_2$ and PbS/TPA/$TiO_2$ articles includes the is absorption peak.

Figure 5:
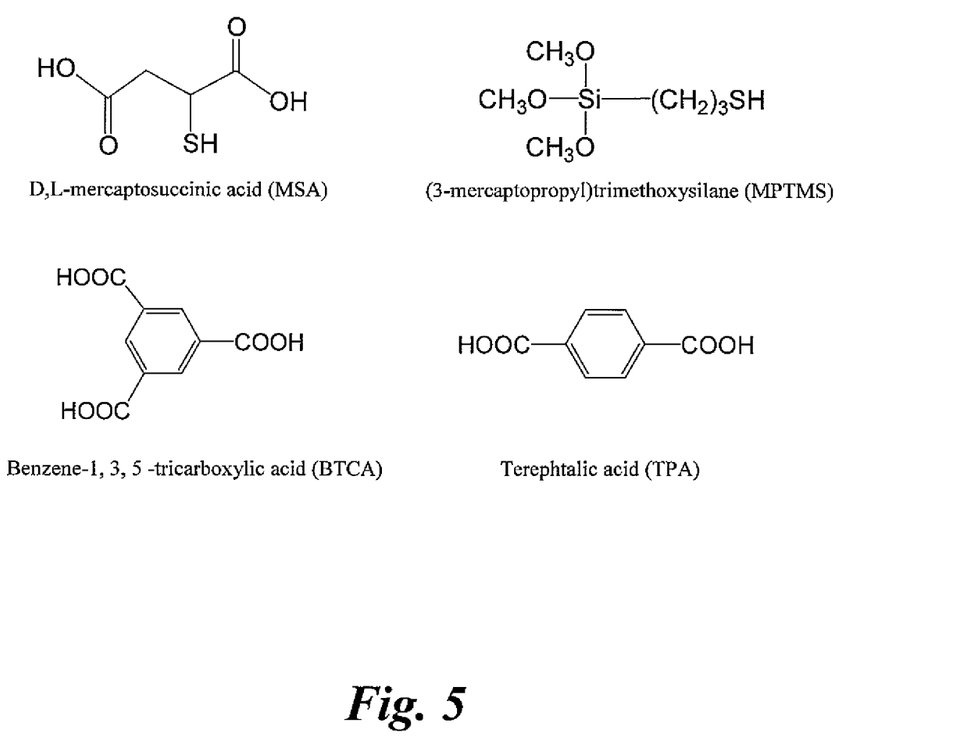
FIG. 5 shows the structures of several linkers suitable for preserving the is absorption peak from the absorption spectra of NQDs attached to a $MO_x$ surface. The linker identified as MPTMS (3-mercaptopropyl)trimethoxysilane is the precursor molecule that reacts with the MOx, and the linker that forms becomes attached to the MOx surface through Si—O bonds.

Several Examples of organic linkers that preserve the is absorption peak of the NQDS are shown in FIG. 5. These include linkers terephthalic acid, which is an example of A-B-C type linker wherein A and C are each a carboxylic acid (—COOH) and B is a rigid spacer (1,4-$C_6H_4$), and the benzene-1,3,5-tricarboxylic acid linker. The linker identified as MPTMS (3-mercaptopropyl)trimethoxysilane is the precursor molecule that reacts with the MOx, and the linker that forms becomes attached to the $MO_x$ surface through Si—O bonds All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An article comprising:
   a substrate;

a metal oxide film on the substrate;
quantum dots selected from PbS, PbSe, and PbTe, said quantum dots having a 1s absorbance peak in an absorbance spectrum of the quantum dots; and
a linker that chemically attaches the quantum dots to the metal oxide film, the linker having the property of preserving the 1s absorbance peak in the absorbance spectrum for the quantum dots attached to the linker, the linker being selected from:
a linker having the structure A-B-C wherein A is a chemical group suitable for chemical bonding to the metal oxide film, wherein C is a chemical group suitable for chemically bonding to the quantum dot, and wherein B is a rigid or semi-rigid spacer group covalently bonded to A and to C and B comprises 1,4-aryl, 1,3-aryl, benzyl, acetylenyl, 1,4-furanyl, 1,3-furanyl, 1,4-thiophenyl, 1,3-thiophenyl, 1,4-pyrrolyl, 1,3-pyrrolyl, 1,3-pyridenyl, 1,4-pyridenyl, 1,3-cyclopentadienyl, 1,4-cyclopentadienyl, adamantyl, napthalenyl, norbornanyl, norbornenyl, and substituted derivatives thereof,
a linker having the structure D-E-G wherein D includes silicon, G is —SH, and E is divalent chemical moiety spacer group covalently bonded to D and to G, and
a linker selected from HOOC—$CR_2$—CH(COOH)(SH) or a carboxylate salt thereof, wherein R is selected from H, alkyl, branched alkyl, cycloalkyl, —F, —Cl, —Br, —I, aryl, substituted aryl, alkenyl, substituted alkynyl, —CN, —OH, —COOH, and COO—.

2. The article of claim 1, wherein the metal oxide comprises a transition metal.

3. The article of claim 2, wherein the metal oxide is a mixed metal oxide.

4. The article of claim 1, wherein the metal oxide comprises a dopant.

5. The article of claim 1, wherein the metal oxide is titanium oxide ($TiO_2$), tin oxide ($SnO_2$), zinc oxide (ZnO), tungsten oxide ($WO_3$), niobium oxide ($Nb_2O_5$), tantalum oxide ($Ta_2O_3$), barium titanate ($BaTiO_3$), strontium titanate ($SrTiO_3$), zinc titanate ($ZnTiO_3$), or copper titanate ($CuTiO_3$).

6. The article of claim 1, wherein the A chemical group of linker A-B-C is selected from —COOH, —COO$^-$, —$PO_3H_2$, —$PO_3H^-$, —$B(OH)_2$, —$BO_2H^-$, —$SO_3H$, and —$SO_3^-$.

7. The article of claim 1, wherein the C chemical group of linker A-B-C is selected from —COOH, —COO$^-$, —$PO_3H_2$, —$PO_3H^-$, —$B(OH)_2$, —$BO_2H^-$, —$SO_3H$, and —$SO_3^-$, and —SH.

8. The article of claim 1, wherein the linker is selected from:
terephthalic acid and benzene-1,3,5-tricarboxylic acid;
a linker having the structure D-E-G, wherein E is a radical having from 1 to 10 carbon atoms; and
HOOC—$CH_2$—CH(COOH)(SH) or a carboxylate salt thereof.

9. The article of claim 1, wherein the linker is D,L-mercaptosuccinic acid, (3-mercaptopropyl)trimethoxysilane, terephthalic acid, or benzene-1,3,5-tricarboxylic acid.

10. An article, comprising:
a substrate;
a metal oxide film on the substrate;
quantum dots selected from PbS, PbSe, and PbTe quantum dots, said quantum dots having a 1s absorbance peak in an absorbance spectrum of the quantum dots; and
a linker that chemically attaches the quantum dots to the metal oxide film, the linker having the property of preserving the 1s absorbance peak in the absorbance spectrum for the quantum dots attached to the linker.

11. The article of claim 10, wherein the metal oxide comprises a transition metal.

12. The article of claim 11, wherein the metal oxide is a mixed metal oxide.

13. The article of claim 10, wherein the metal oxide comprises a dopant.

14. The article of claim 10, wherein the metal oxide is selected from titanium oxide ($TiO_2$), tin oxide ($SnO_2$), zinc oxide (ZnO), tungsten oxide ($WO_3$), niobium oxide ($NbO_3$), tantalum oxide ($Ta_2O_3$), barium titanate ($BaTiO_3$), strontium titanate ($SrTiO_3$), zinc titanate ($ZnTiO_3$), and copper titanate ($CuTiO_3$).

15. The article of claim 10, wherein said linker is a linker having the structure A-B-C wherein A is —COOH, —COO$^-$, —$PO_3H_2$, —$PO_3H^-$, —$B(OH)_2$, —$BO_2H^-$, —$SO_3H$, and —$SO_3^-$, wherein C is —COOH, —COO$^-$, —$PO_3H_2$, —$PO_3H^-$, —$B(OH)_2$, —$BO_2H^-$, —$SO_3H$, —$SO_3^-$, or —SH, and wherein B is a rigid or semi-rigid spacer group covalently bonded to A and to C and B comprises 1,4-aryl, 1,3-aryl, benzyl, acetylenyl, 1,4-furanyl, 1,3-furanyl, 1,4-thiophenyl, 1,3-thiophenyl, 1,4-pyrrolyl, 1,3-pyrrolyl, 1,3-pyridenyl, 1,4-pyridenyl, 1,3-cyclopentadienyl, 1,4-cyclopentadienyl, adamantyl, napthalenyl, norbornanyl, norbornenyl, and substituted derivatives thereof.

16. The article of claim 10, wherein the linker is a linker having the structure D-E-G wherein D comprises silicon, G is —SH, and E is divalent chemical moiety spacer group covalently bonded to D and to G.

17. The article of claim 10, wherein the linker is a linker selected from HOOC—$CR_2$—CH(COOH)(SH) or a carboxylate salt thereof, wherein R is selected from H, alkyl, branched alkyl, cycloalkyl, —F, —Cl, —Br, —I, aryl, substituted aryl, alkenyl, substituted alkynyl, —CN, —OH, —COOH, and COO—.

18. An article comprising:
a substrate;
a metal oxide film on the substrate;
quantum dots selected from PbS, PbSe, and PbTe, said quantum dots having a 1s absorbance peak in an absorbance spectrum of the quantum dots; and
a linker that chemically attaches the quantum dots to the metal oxide film, the linker having the property of preserving the 1s absorbance peak in the absorbance spectrum for the quantum dots attached to the linker, the linker being selected from:
terephthalic acid and benzene-1,3,5-tricarboxylic acid,
a linker having the structure D-E-G wherein D includes silicon, G is —SH, and E is divalent chemical moiety spacer group having from 1 to 10 carbon atoms covalently bonded to D and to G, and
a linker selected from HOOC—$CR_2$—CH(COOH)(SH) or a carboxylate salt thereof, wherein R is selected from H, alkyl, branched alkyl, cycloalkyl, —F, —Cl, —Br, —I, aryl, substituted aryl, alkenyl, substituted alkynyl, —CN, —OH, —COOH, and COO—.

19. The article of claim 18, wherein E is an aliphatic radical having from 1 to 3 carbon atoms.

20. The article of claim 19, wherein R is hydrogen.

* * * * *